US012060024B1

(12) United States Patent
Palazzolo et al.

(10) Patent No.: US 12,060,024 B1
(45) Date of Patent: Aug. 13, 2024

(54) KNEE AIRBAG

(71) Applicant: ZF Passive Safety Systems US Inc., Washington, MI (US)

(72) Inventors: Joseph Palazzolo, Shelby Township, MI (US); Douglas Gould, Lake Orion, MI (US); Jaime Fermin Perez, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 18/105,949

(22) Filed: Feb. 6, 2023

(51) Int. Cl.
*B60R 21/206* (2011.01)
*B60R 21/231* (2011.01)
*B60R 21/233* (2006.01)
*B60R 21/2338* (2011.01)

(52) U.S. Cl.
CPC .......... *B60R 21/206* (2013.01); *B60R 21/233* (2013.01); *B60R 21/2338* (2013.01); *B60R 2021/23169* (2013.01); *B60R 2021/23316* (2013.01)

(58) Field of Classification Search
CPC . B60R 21/206; B60R 21/233; B60R 21/2338; B60R 2021/0051; B60R 2021/0053; B60R 2021/23169; B60R 2021/23308; B60R 2021/23316; B60R 2021/23324; B60R 2021/23382; B60R 2021/23386
See application file for complete search history.

(56) References Cited

U.S. PATENT DOCUMENTS

| | | | | |
|---|---|---|---|---|
| 6,685,217 B2* | 2/2004 | Abe | .................... | B60R 21/233 280/743.2 |
| 6,916,039 B2* | 7/2005 | Abe | .................... | B60R 21/233 280/752 |
| 6,945,557 B2* | 9/2005 | Takimoto | .............. | B60R 21/233 280/730.1 |
| 7,152,873 B2* | 12/2006 | Peng | ................... | B60R 21/2338 280/730.1 |

(Continued)

FOREIGN PATENT DOCUMENTS

| | | | | |
|---|---|---|---|---|
| JP | 2017144840 A | * | 8/2017 | |
| JP | 2017213995 A | * | 12/2017 | |
| JP | 2018016083 A | * | 2/2018 | |

*Primary Examiner* — Laura Freedman
(74) *Attorney, Agent, or Firm* — Tarolli, Sundheim, Covell & Tummino LLP

(57) ABSTRACT

A knee airbag includes overlying panels interconnected along a perimeter connection to define an inflatable volume of the knee airbag. The knee airbag includes a filling portion and a cushion portion. The filling portion is configured to receive inflation fluid from an inflator and to direct the inflation fluid from the inflator to the cushion portion. The cushion portion has a width that is greater than a width of the filling portion and extends laterally beyond the width of the filling portion on opposite sides of the filling portion. The knee airbag also includes at least one tether having a first end connected to the cushion portion and an opposite second having a connection configured to anchor the at least one tether. The at least one tether is configured to limit movement of the cushion portion and to help position the cushion portion relative to a vehicle surface for which the knee airbag is configured to help prevent impacts from a vehicle occupant.

14 Claims, 5 Drawing Sheets

(56) References Cited

U.S. PATENT DOCUMENTS

| | | | | |
|---|---|---|---|---|
| 7,182,365 B2 | * | 2/2007 | Takimoto | B60R 21/206 280/743.1 |
| 7,314,230 B2 | * | 1/2008 | Kumagai | B60R 21/233 280/743.2 |
| 7,766,374 B2 | * | 8/2010 | Abele | B60R 21/2338 280/743.2 |
| 8,083,254 B2 | * | 12/2011 | Enders | B60R 21/2338 280/743.2 |
| 8,096,578 B2 | * | 1/2012 | Wigger | B60R 21/231 280/743.2 |
| 8,297,649 B2 | * | 10/2012 | Enders | B60R 21/231 280/743.2 |
| 8,393,638 B2 | * | 3/2013 | Gottschalk | B60R 21/231 280/752 |
| 8,430,422 B2 | * | 4/2013 | Wehner | B60R 21/235 280/743.1 |
| 8,500,161 B2 | * | 8/2013 | Chavez | B60R 21/231 280/743.2 |
| 8,540,276 B2 | * | 9/2013 | Schneider | B60R 21/237 280/743.1 |
| 8,696,020 B2 | * | 4/2014 | Tanaka | B60R 21/233 280/743.1 |
| 8,814,201 B2 | * | 8/2014 | Webber | B60R 21/206 280/743.2 |
| 9,308,883 B1 | * | 4/2016 | Schneider | B60R 21/231 |
| 9,469,270 B2 | * | 10/2016 | Abe | B60R 21/206 |
| 9,580,040 B2 | * | 2/2017 | Komatsu | B60R 21/233 |
| 9,650,008 B2 | * | 5/2017 | Abele | B60R 21/231 |
| 9,669,793 B2 | * | 6/2017 | Jung | B60R 21/237 |
| 9,815,429 B2 | * | 11/2017 | Schneider | B60R 21/239 |
| 10,086,788 B2 | * | 10/2018 | Ando | B60R 21/231 |
| 10,259,418 B2 | * | 4/2019 | Schuler | B60R 21/237 |
| 10,457,243 B2 | * | 10/2019 | Munsee | B60R 21/239 |
| 10,486,635 B2 | * | 11/2019 | Karlow | B60R 21/207 |
| 10,583,799 B2 | * | 3/2020 | Schneider | B60R 21/2338 |
| 10,618,494 B2 | * | 4/2020 | Anae | B60R 21/206 |
| 10,759,376 B2 | * | 9/2020 | Jindal | B60R 21/20 |
| 10,857,965 B2 | * | 12/2020 | Abe | B60R 21/214 |
| 10,953,840 B2 | * | 3/2021 | Rutgersson | B60R 21/237 |
| 11,148,629 B2 | * | 10/2021 | Sekizuka | B60R 21/231 |
| 11,305,717 B2 | * | 4/2022 | Shrivatri | B60R 21/206 |
| 11,383,667 B1 | * | 7/2022 | Kadam | B60R 21/23138 |
| 11,560,117 B2 | * | 1/2023 | Navarro Arranz | B60R 21/214 |
| 11,685,328 B2 | * | 6/2023 | Faruque | B60R 21/205 280/743.2 |
| 2005/0151351 A1 | * | 7/2005 | Enders | B60R 21/235 280/730.1 |
| 2019/0161045 A1 | * | 5/2019 | Thomas | B60R 21/2338 |

\* cited by examiner

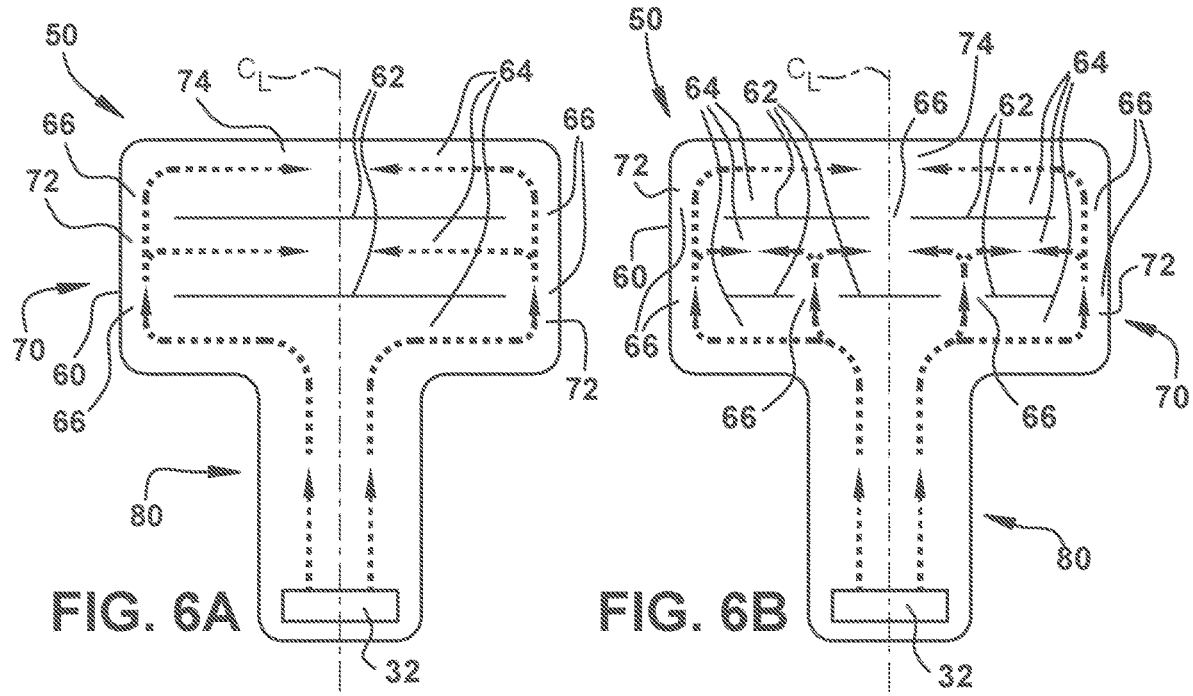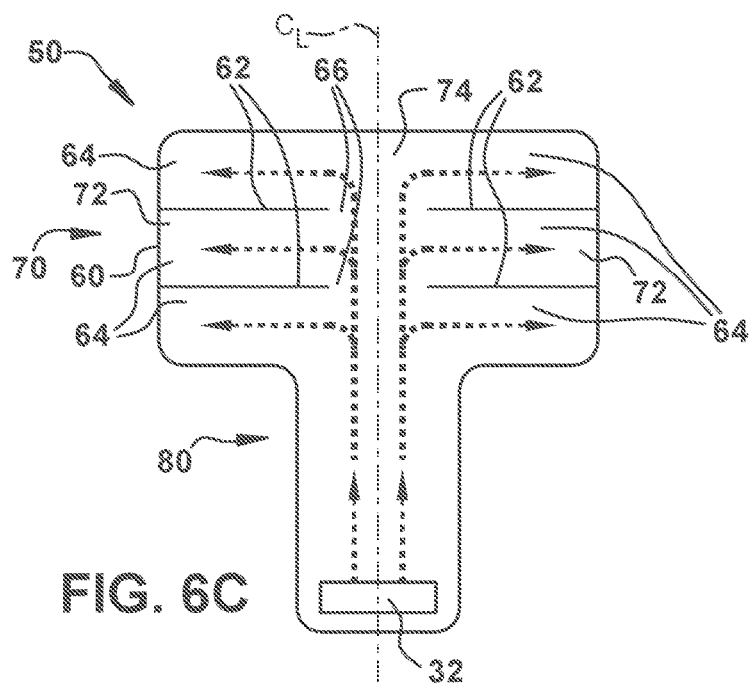

KNEE AIRBAG

TECHNICAL FIELD

This disclosure relates to an apparatus for helping to protect an occupant of a vehicle upon the occurrence of an event, such as a vehicle collision. More particularly, this disclosure relates to a knee airbag.

BACKGROUND

It is known to deploy an inflatable vehicle occupant protection device, such as an airbag, upon the occurrence of an event for which occupant protection is desired, such as a vehicle collision or rollover. The airbag is part of a conventional vehicle occupant protection apparatus that includes a sensor and an inflation fluid source, such as an inflator. Upon sensing the occurrence of an event for which deployment of the airbag is desired, the inflation fluid source is actuated and produces inflation fluid that inflates the airbag, causing it to deploy into the vehicle occupant compartment to help protect the vehicle occupants.

One particular type of inflatable vehicle occupant protection device is a knee airbag. Knee airbags are typically stored in a housing that is mounted in the lower portion of the instrument panel, in the area of the footwell. Knee airbags are inflatable to a deployed condition in which the knee airbag is positioned between the occupant's legs and the instrument panel to help protect the vehicle occupant from injury, particularly to the occupant's legs.

SUMMARY

A knee airbag has a generally T-shaped configuration that provides a reduction in material cost while, at the same time, improves trajectory and stability. The use of a T-shaped configuration provides a gas path that is more direct, which improves deployment time and efficiency. The T-shape of the knee airbag can eliminate some chambers where coverage is not required and thereby reduce overall airbag volume and material usage. The knee airbag can be sewn easily using automated sewing machines, and its generally flat sewn configuration is ideal for automated folding.

According to one aspect, a knee airbag includes overlying panels interconnected along a perimeter connection to define an inflatable volume of the knee airbag. The knee airbag includes a filling portion and a cushion portion. The filling portion is configured to receive inflation fluid from an inflator and to direct the inflation fluid from the inflator to the cushion portion. The cushion portion has a width that is greater than a width of the filling portion and extends laterally beyond the width of the filling portion on opposite sides of the filling portion. The knee airbag also includes at least one tether having a first end connected to the cushion portion and an opposite second having a connection configured to anchor the at least one tether. The at least one tether is configured to limit movement of the cushion portion and to help position the cushion portion relative to a vehicle surface for which the knee airbag is configured to help prevent impacts from a vehicle occupant.

According to another aspect, the overlying panels can be interconnected within the perimeter connection along one or more interior connections that define inflatable chambers within the inflatable volume According to another aspect, the at least one tether can be located outside the inflatable volume of the knee airbag.

According to another aspect, the first end of the at least one tether can be connected to an exterior surface of the cushion portion and the second end of the at least one tether can be connected to an exterior surface of the filling portion.

According to another aspect, the first end of the at least one tether can be connected to an exterior surface of the cushion portion and the second end of the at least one tether can be configured for connection to an airbag housing.

According to another aspect, the first end of the at least one tether can be connected to an exterior surface of the cushion portion and the second end of the at least one tether can be configured for connection to a vehicle structure.

According to another aspect, the at least one tether can be configured to become tensioned in response to the knee airbag being inflated, and the at least one tether can be configured to enforce a curved configuration of the knee airbag in response to being tensioned in response to the knee airbag being inflated.

According to another aspect, the at least one tether can have a first end connected to the cushion portion vertically above a centerline of the knee airbag, and an opposite second end connected to the filling portion along the centerline of the knee airbag.

According to another aspect, the filling portion can have a first end configured to receive inflation fluid from the inflator. The cushion portion can be fluidly connected to the filling portion at a second end of the filling portion, opposite the first end of the filling portion.

According to another aspect, the knee airbag can be configured to have a generally T-shape. The filling portion can have a length that extends along a centerline of the knee airbag and a width that extends transverse to the length. The cushion portion can have a width that extends transverse to the centerline and laterally beyond opposite lateral sides of the filling portion.

According to another aspect, the at least one tether can extend diagonally from the first end of the filling portion to a lateral end of the cushion portion.

According to another aspect, the at least one tether can have a first end connected to the cushion portion vertically above a centerline of the knee airbag, and an opposite second end connected to the filling portion along the centerline of the knee airbag.

According to another aspect, the at least one tether can include a first tether that extends diagonally from the first end of the filling portion to a first lateral end of the cushion portion, and a second tether that extends diagonally from the first end of the filling portion to a second lateral end of the cushion portion, opposite the first lateral end of the cushion portion.

According to another aspect, the first and second tethers each can have a first end connected to the cushion portion vertically above a centerline of the knee airbag, and an opposite second end connected to the filling portion along the centerline of the knee airbag.

According to another aspect, the overlying panels can include flat fabric panels that are similarly or identically patterned. The panels can be configured to lie flat in the overlying manner while the perimeter connection and any interior connections within the perimeter connection are formed.

According to another aspect, the perimeter connection and any interior connections within the perimeter connection can be formed by stitching or ultrasonic welding.

According to another aspect, a knee airbag module can include a knee airbag according to any of the preceding aspects, an inflator for inflating the knee airbag, and a housing for supporting the knee airbag and inflator. The housing can include an opening through which the knee airbag deploys and can be configured to be mounted in a vehicle instrument panel in the area of a footwall of the vehicle.

According to another aspect, a vehicle safety system can include the knee airbag module, a sensor configured to sense the occurrence of an event for which deployment of the knee airbag is desired, and a controller configured to actuate the inflator to deploy the knee airbag in response to the sensor.

According to another aspect, a vehicle safety system can include the knee airbag module, and the second end of the at least one tether can be connected to the housing.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIGS. 6A-6C are plan views showing variations in chamber configurations that can be implemented in the knee airbag.

DETAILED DESCRIPTION

Figure 1:
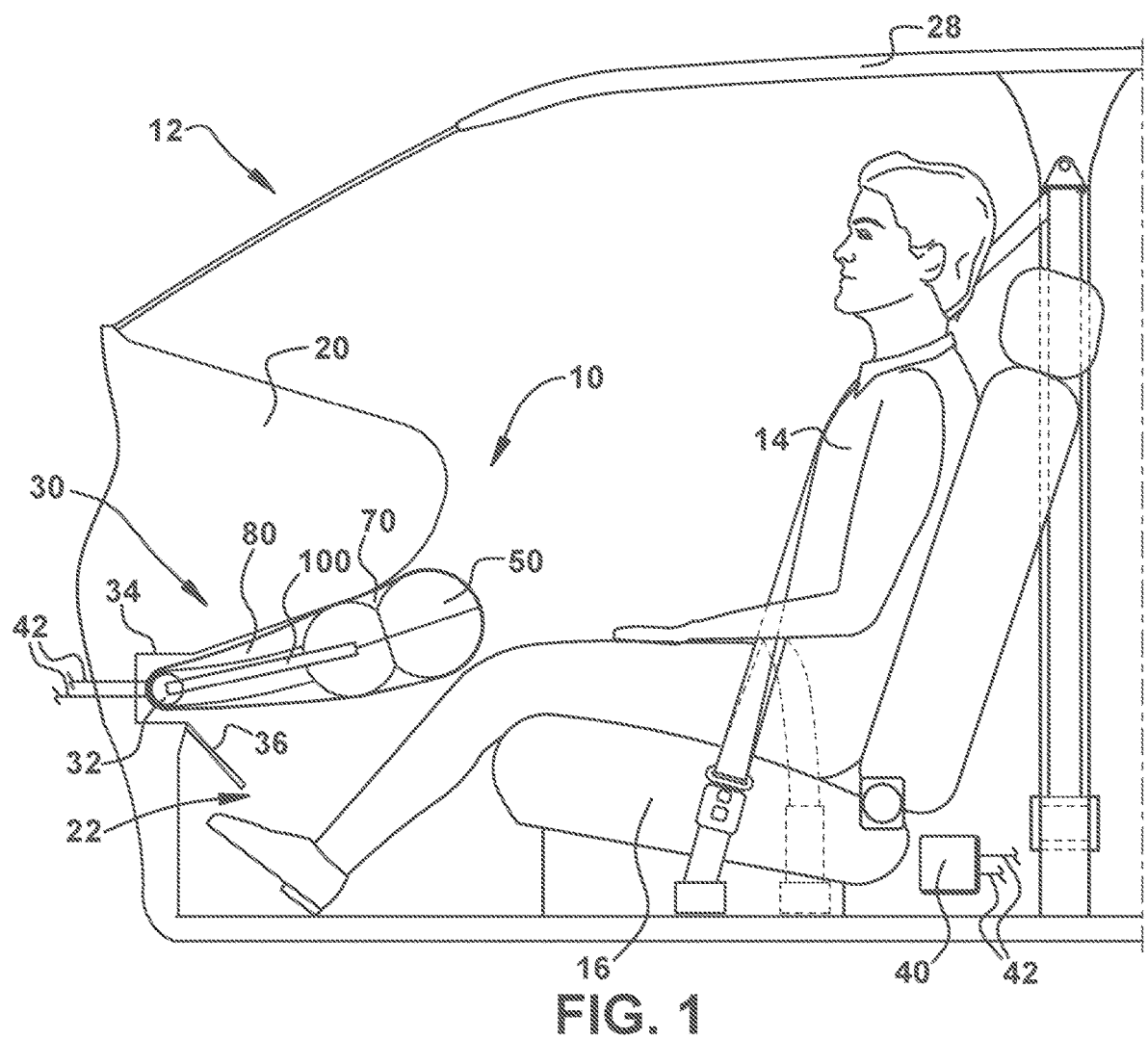
FIG. 1 is a side view that illustrates schematically a vehicle safety system including an apparatus for helping to protect an occupant of a vehicle.

A vehicle safety system 10 for helping to protect an occupant 14 of a vehicle 12 is shown in FIG. 1. The safety system 10 includes an apparatus in the form of a knee airbag module 30 that includes an inflatable knee airbag 50, an inflator 32 for inflating the knee airbag 50, and a housing 34 for supporting the knee airbag and inflator. The knee airbag module 30 is configured to be connected to an instrument panel 20 of the vehicle 12 adjacent or near a footwell 22 of the vehicle.

In the embodiment illustrated in FIG. 1, the knee airbag module 30 is a passenger knee airbag module configured to help protect the occupant 14 on a passenger side seat 16 of the vehicle 12. Those skilled in the art will appreciate that the system and apparatus 10 disclosed herein could be adapted for a driver side or center seated vehicle occupant (not shown) or, depending on the vehicle configuration, occupants of rearward rows of the vehicle 12, such as a 2nd row, 3rd row, etc. (not shown).

The knee airbag 50 has a stored condition (not shown) in which the knee airbag is folded and placed in the housing 34. The housing 34 helps contain and support the knee airbag 50 in the instrument panel 20. The knee airbag module 30 is concealed in the instrument panel 20, for example, by a cover 36 in the form of a door or panel that is a component of the module itself, a portion of the instrument panel, a trim piece of the instrument panel, or a combination of these components.

The inflator 32 is actuatable to provide inflation fluid to an inflatable volume of the knee airbag 50 to deploy the knee airbag to the inflated condition, which is shown in solid lines in FIG. 1. The inflator 32 may be of any known type, such as a solid propellant or stored gas design, or a hybrid design implementing both solid propellant and stored gas. The safety system 10 includes a sensor, illustrated schematically at 40, for sensing an event for which inflation of the knee airbag 50 is desired, such as a collision. The inflator 32 is operatively connected to the sensor 40 via lead wires 42.

The knee airbag 50 can be constructed of any suitable material, such as a woven nylon (e.g., nylon 6-6), and may be constructed in any suitable manner. For example, the knee airbag 50 may include one or more pieces or panels of material. If more than one piece or panel is used, the pieces or panels may be interconnected by known means, such as stitching, ultrasonic welding, heat bonding, or adhesives, to form the knee airbag 50. As will be described below, the knee airbag 50 can have a simplified construction that helps minimize the complexity of manufacture.

For example, the knee airbag 50 can be constructed of overlying panels of material, having a similar or identical shape or pattern, that are interconnected via stitching along a periphery of the panels to define the perimeter of the inflatable volume. The panels can be interconnected along connections within the peripheral connection to define inflatable chambers of the knee airbag 50. This simplified flat construction can facilitate automated cutting and stitching of the panels, which helps reduce the manual labor required to produce the knee airbag 50.

As another example, the knee airbag 50 can have a one piece woven (OPW) construction in which the airbag is woven as a whole in a single weaving process. In this construction, the overlying panels are woven simultaneously, with their peripheries woven together as a single layer to define a peripheral connection that defines the inflatable volume of the knee airbag 50. The panels can also be interwoven as a single layer to define inflatable chambers within the peripheral connection. The OPW process produces a flat construction that helps reduce or minimize the manual labor required to produce the knee airbag 50.

The knee airbag 50 may be uncoated, coated with a material, such as a gas impermeable urethane, or laminated with a material, such as a gas impermeable film. The knee airbag 50 thus may have a gas-tight or substantially gas-tight construction. Those skilled in the art will appreciate that alternative materials, such as polyester yarn, and alternatives coatings, such as silicone, may also be used to construct the knee airbag 50.

Figure 2:
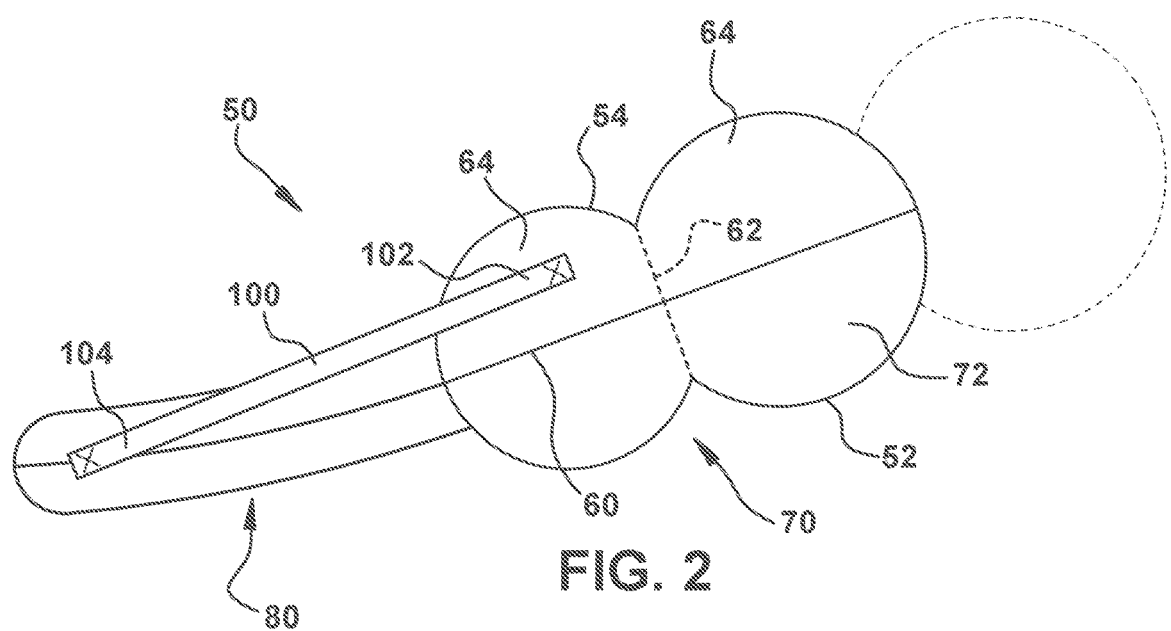
FIG. 2 is a side view of the knee airbag of FIG. 2.
Figure 3:
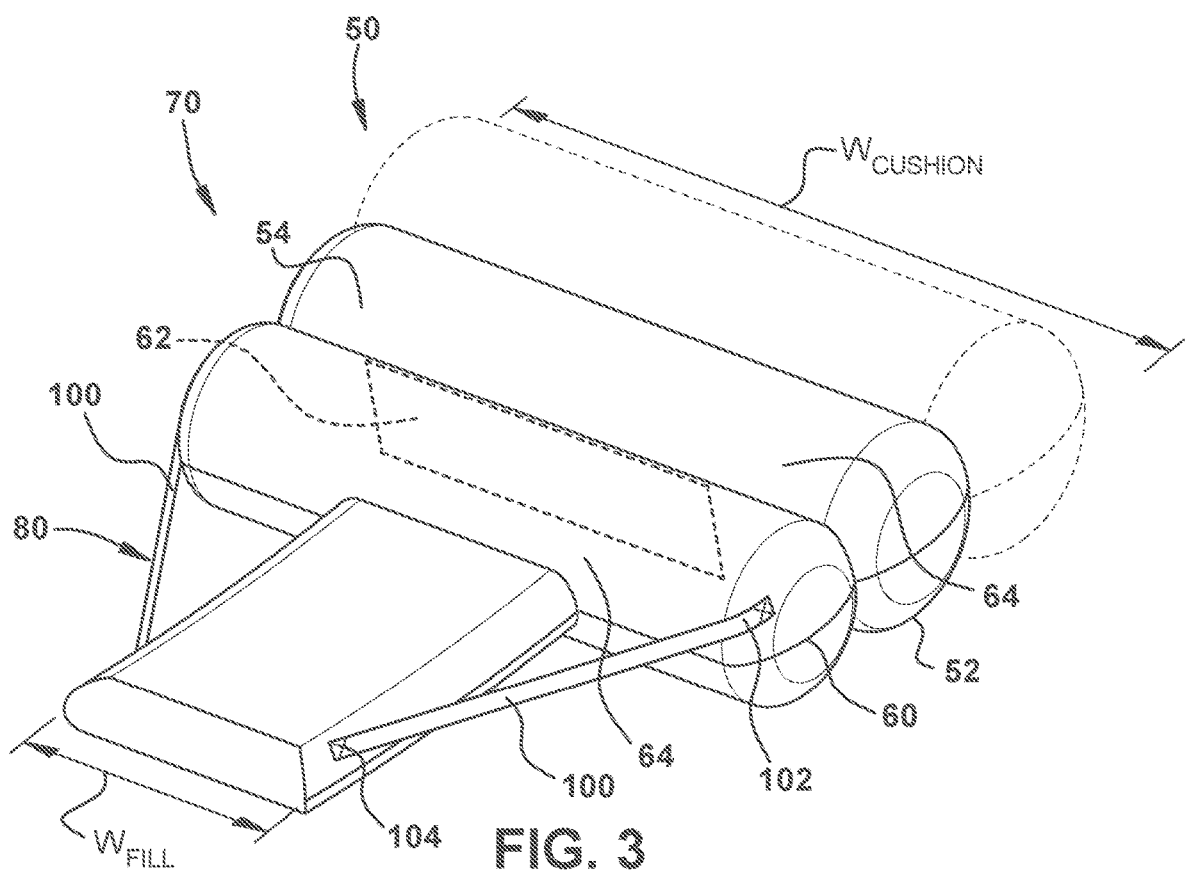
FIG. 3 is a perspective view of a knee airbag that forms a portion of the vehicle safety system, according to an example configuration.
Figure 4:
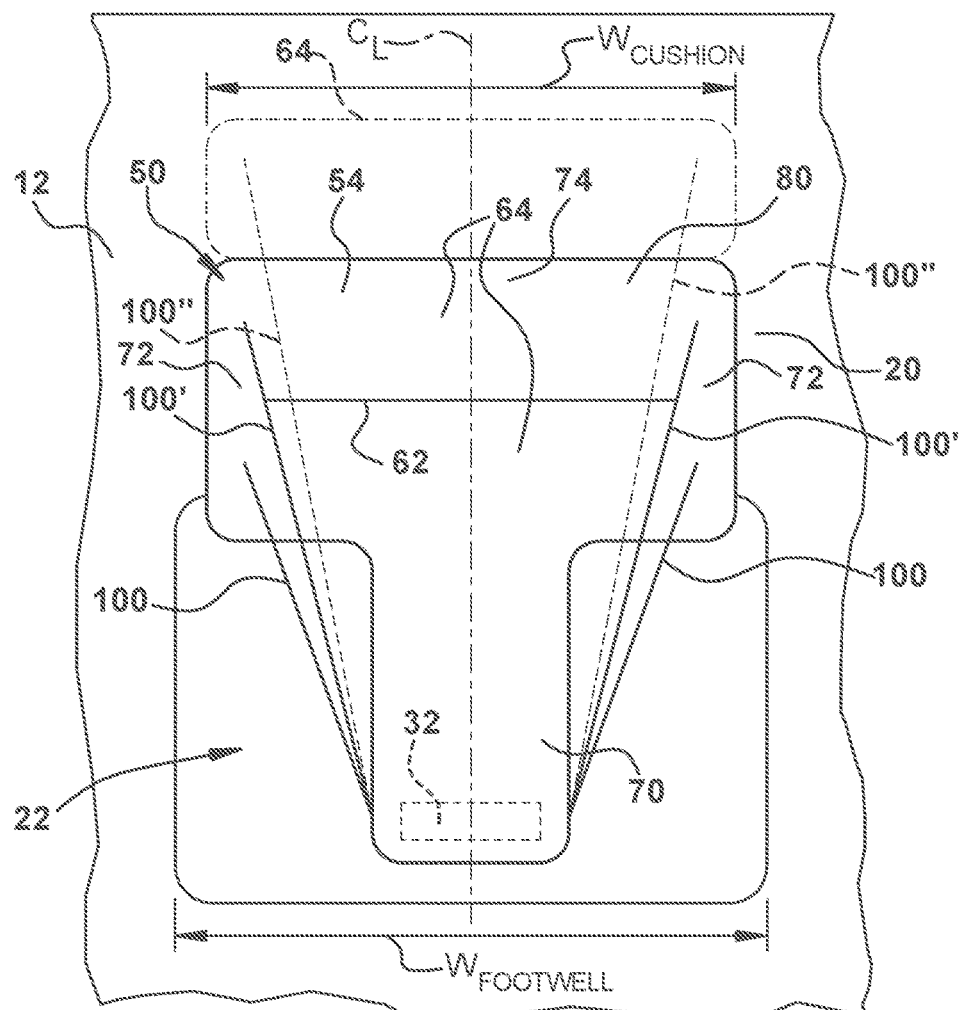
FIG. 4 is a plan view illustrating example configurations of the knee airbag.

An example configuration of the knee airbag 50 is illustrated in FIGS. 2-4. As shown in these figures, the knee airbag 50 has a simple construction, with a front panel 52 configured to face the occupant 14 and a rear panel 54 configured to engage the instrument panel 20. The front and rear panels 52, 54 are interconnected about a peripheral connection 60, such as an OPW single layer seam or a stitched, adhesively connected, or welded seam. Within the periphery, the panels 52, 54 can be interconnected at one or more interior connections 62, such as a single-layer OPW portion, a direct panel-to-panel connection via a stitched, adhesively connected, or welded seam, or via a tether connected to both the front panel and rear panel, again via a stitched connection, adhesive connection, or welded connection. Implementing a tether could, however, increase the complexity of the manufacturing process used to construct the knee airbag 50. Regardless of the construction, the interior connections 62 help limit the expansion of the panels 52, 54, control the inflated thickness of the knee airbag 50, as measured between the front and rear panels, and define inflatable chambers 64 of the knee airbag.

The knee airbag 50 has a generally T-shaped configuration, with a cushion portion 70 and a filling portion 80. The filling portion 80 is connected to the inflator 32 and receives inflation fluid from the inflator. The filling portion 80 directs the inflation fluid to the cushion portion 70. The filling portion 80 is configured to extend along a portion of the instrument panel 20 facing a portion of the footwell 22 that the occupant 14 is not likely to impact during a collision event and therefore is not expected to provide a cushioning effect for the occupant. This being the case, the filling portion 80 is configured to have a narrowed, reduced cross-sectional area, as its purpose is not necessarily to provide cushioning, but to deliver inflation fluid to the cushion portion 70.

As shown in FIG. 1, cushion portion 70 covers a portion of the instrument panel 20 where occupant protection from impacts is desired. As such, the cushion portion 70 has a width $W_{Cushion}$ that is greater than a width of the filling portion 80 $W_{Fill}$. the width $W_{Cushion}$ of the cushion portion 70 is configured to extend widthwise across the instrument panel 20 to an extent that the cushion portion 70 covers the instrument panel 20 across or substantially across the width of the footwell 22, indicated generally at $W_{Footwell}$ in FIG. 4.

The cushion portion 70 is defined, in part, by the interior connections 62. The interior connections 62 of the cushion portion 70 are lateral in nature, meaning that they are configured to extend widthwise across the airbag 50, i.e., across the instrument panel 20 and footwell 22, as viewed from the perspective of the seated occupant 14. The horizontally extending interior connections 62 help define the horizontally extending inflatable chambers 64 of the cushion portion 70 of the knee airbag 50.

Figure 5:
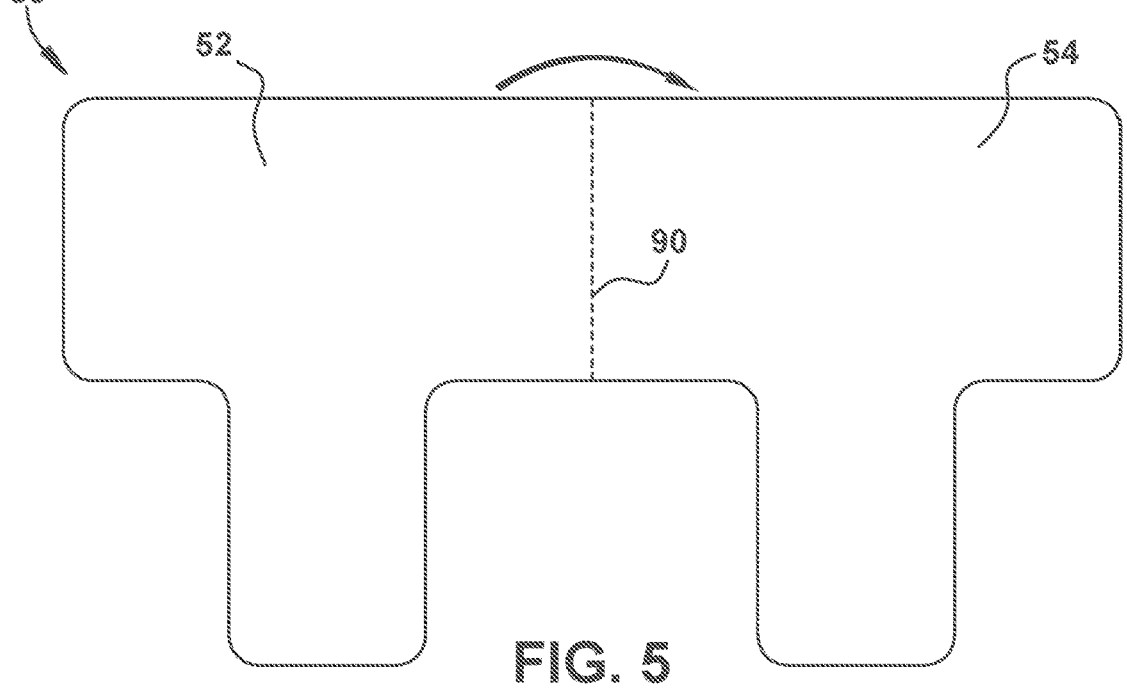
FIG. 5 is a plan view illustrating an example flat construction configuration of the knee airbag.

The construction of the knee airbag 50 can be as simple as that of a flat-sewn construction, implementing overlying flat panels 52, 54 with a peripheral stitched connection 60 extending about their peripheries and stitched interior connections 62 defining the inflatable chambers 64. The panels 52, 54 can be similar or identical, which allows for ease in production, as the panels can be cut from stock fabric materials in an automated fashion, implementing a cut pattern that nests the T-shaped panels to minimize material waste. By "similar," it is meant that one of the panels 52, 54 might include features, such as fastener openings, that are not included in the other panel, while the overall shape/configurations of the panels remains identical. The flat-sewn construction also lends to automated sewing because the panels 52, 54 require no re-positioning or manipulation other than being lying flat on top of each other. Furthermore, in a flat-sewn construction, the panels 52, 54 can be formed as a single panel delineated by a fold 90 that forms one "leg" of the peripheral connection (see FIG. 5), with the remaining legs being stitched or otherwise connected. This further lends to an automated construction, as the panels can be cut, folded, and stitched, all via machine with little or no human manipulation required.

This construction, while efficient and cost-effective, is not absolute. For example, the flat-sewn constructions described in the preceding paragraph can be modified to implement laser cutting, ultrasonic welding, adhesive connections to form any or all of the connections 60, 62. An OPW construction, while avoiding the time and cost of separate cutting, panel positioning, and stitching/connecting steps, would add the cost associated with the complex equipment required to perform the weaving operation and the increased time that weaving involves.

In one alternative configuration, the interior connections 62 can be formed by tethers (see tether 62 in FIG. 3) that interconnect the panels 52, 54. In a sewn construction of the airbag 50, the tethers 62 would increase the complexity of the airbag construction and the manufacturing process used to produce the same. Still, using tethers, such as elongated, rectangular, generally uniform tethers to control the thickness of the bag and provide inflatable chambers 64, is simple and inexpensive to produce in comparison with more complicated constructions.

In addition to controlling the inflated thickness of the cushion portion 70 of the knee airbag 50, the interior connections 62 forming the horizontally extending chambers 64 of the cushion portion can also help control the inflation characteristics of the cushion portion specifically and the knee airbag in general. Because the inflation fluid is directed axially through the filling portion 80, generally along a central axis or centerline $C_L$ (see FIG. 4) of the knee airbag 50, and because the chambers 64 extend transverse, e.g., perpendicular, to the centerline, the interior connections 62 forming the chambers directs or redirects the inflation fluid into the chambers. This redirection is done via passages formed by the interior connections 62, either by breaks in the connections, by spacing end points of the connections from the peripheral connections 60, or by a combination thereof.

For example, referring to FIG. 6A-C, passages 66 between the chambers 64 of the cushion portion 70 are formed by breaks in the interior connections 62 themselves (FIG. 6A), by spacing between ends of the interior connections and the peripheral connection 60 (FIG. 6B), and by a combination thereof (FIG. 6C). The example configurations of FIGS. 6A-C illustrate how the interior connections 62 and the passages 66 formed by the interior connections can help control deployment of the knee airbag 50, particularly the cushion portion 70.

In FIG. 6A, the interior connections 62 are unbroken, with opposite ends spaced from the peripheral connections 60. The passages 66 in FIG. 6A are therefore located at opposite ends of the chambers 64. In this configuration, the interior connections 62 and passages 66 direct inflation fluid to fill the chambers 64 from the ends inward toward the centerline $C_L$. As a result of this outward-in inflation, lateral end portions 72 of the cushion portion 70 inflate first, followed by a center portion 74 of the of the cushion portion. This can be beneficial in that the end portions, which correspond to the knee positions of a normally seated occupant, can inflate first. Of course, this outward-in inflation requires an initial outward diversion of the fluid flow path, followed by a redirection around the ends of the interior connections 62 and beck in toward the centerline $C_L$. Therefore, the outward-in inflation of the cushion portion 70 in the example configuration of FIG. 6A could be desirable or effective in a vehicle where the configuration of the vehicle 12, particularly the footwell 22 necessitates a more narrow width of the cushion portion.

In FIG. 6B, the interior connections 62 are broken, with opposite ends intersecting the peripheral connections 60. The passages 66 in FIG. 6B are therefore located centrally in the chambers 64. In this configuration, the interior connections 62 and passages 66 direct inflation fluid to fill the chambers 64 from the middle, i.e., from the centerline $C_L$, laterally outward into the chambers. As a result of this inward-out inflation, the center portion 74 inflates first, followed by the lateral end portions 72. This can be beneficial in that the inflation fluid is directed axially along the filling portion 80 into the center portion 74, where it is redirected laterally outward into the end portions 72. This single redirection of inflation fluid flow can be more direct that other configurations, such as an outward-in configuration. Therefore, the inward-out inflation of the cushion portion 70 in the example configuration of FIG. 6B could be desirable or effective in a vehicle where the configuration of the vehicle 12, particularly the footwell 22 necessitates a widened width of the cushion portion.

In FIG. 6C, the configurations of the interior connections 62 combine features of the configurations illustrated in FIGS. 6A and 6B. More specifically, the connections 62 have end portions spaced from the peripheral connection 60 and are also broken along their lengths. The passages 66 in FIG. 6C are therefore located both at the ends of the chambers 64 and centrally in the chambers. In this configuration, the interior connections 62 and passages 66 direct inflation fluid to fill the chambers 64 from the middle out and from the ends in. This can promote a more uniform inflation of the cushion portion 70 across its width because the inflation fluid is directed in both outward-in and inward-out directions. Therefore, the configuration of the cushion portion 70 in the example configuration of FIG. 6C could be desirable or effective in a vehicle where the configuration of the vehicle 12, particularly the footwell 22 necessitates rapid inflation and deployment. This could be the case, for example, where the vehicle has a more confined footwell with structures positioned close to the occupant.

As shown in FIGS. 1-4, the knee airbag 50 can include tethers 100 for helping to control its deployment and position. The tethers 100 anchor the cushion portion 70 and help to control its deployment, movement, and position. The tethers 100 have first ends 102 connected to the lateral end portions 72 of the cushion portion 70 and opposite second ends 104 that anchor the tether to the vehicle structure. In the example configurations illustrated in the figures, the second ends 104 are connected to the filling portion 80 at or near the location of the inflator 32. The second ends 104 can, however, be connected at different locations. For example, the second ends 104 can be connected to the filling portion 80 at a location spaced from the inflator, i.e., closer to the cushion portion 70. As another example, the second ends 104 can be connected to the airbag module 30, for example, to the housing 34 (see, e.g., FIG. 1). As a further example, the second ends 104 can be connected to vehicle structure, such as the instrument panel or structure located inside the instrument panel.

The tethers 100 help control the deployment of the knee airbag 50 by limiting movement of the cushion portion 70, particularly the end portions 72 during inflation. As the knee airbag 50 inflates and deploys, movement of the central portion 74 of the cushion portion 70 is limited by the filing portion 80. As the central portion 74 reaches the deployed condition, the filling portion 80 becomes tensioned and thereby prevents further movement of the central portion in the deployment direction, thus maintaining the central portion in the deployed position.

Deployment of the end portions 74 is not restricted by the filling portion 80, at least as completely restricted as is the central portion 72. Whereas the central portion 72 is positioned in-line with the filling portion 80 along the deployment axis of the knee airbag (represented by the centerline $C_L$), the end portions 74 are laterally offset from the filling portion. As a result, the end portions 74 can be carried beyond their deployed conditions/positions due to their own momentum. Of course, if this occurs, the end portions 74 will snap back into position under the pressure of inflation fluid. The issue here, however, would be whether that initial overshoot of the end portions 74 coincides with the movement of the occupant's knees into engagement with the instrument panel 20. Implementation of the tethers 100 will prevent this overshoot from occurring.

Once the knee airbag 50 is inflated and deployed, the tethers 100 also help maintain the position of the cushion portion 70, especially the end portions 74. For example, the tethers 100 can help prevent the occupant from what is known as "submarining," that is, the occupant's knees sliding under the inflated and deployed end portions 74 into engagement with the instrument panel 20. This occurs when the knees impact the end portions 74 at an angle that creates upward force components on the end portions, which causes them to deflect and allow the knees to contact the instrument panel 20. If the occupant impacting the knee airbag 50 was to produce an upward force in this manner, the tethers 100 would act in tension to block upward movement of the end portions 74.

The tethers 100 can be connected to the knee airbag 50 in a variety of manners. For example, the first ends 102 of the tethers 100 can be connected to any of the chambers 64 of the knee airbag 50. As shown in FIG. 4, the tethers 100 can be connected to a first chamber 64 that intersects the filling portion 80, to a second chamber behind the first chamber, or to an additional chamber (shown in dashed lines in FIG. 4) as the case may be.

Figure 7A:
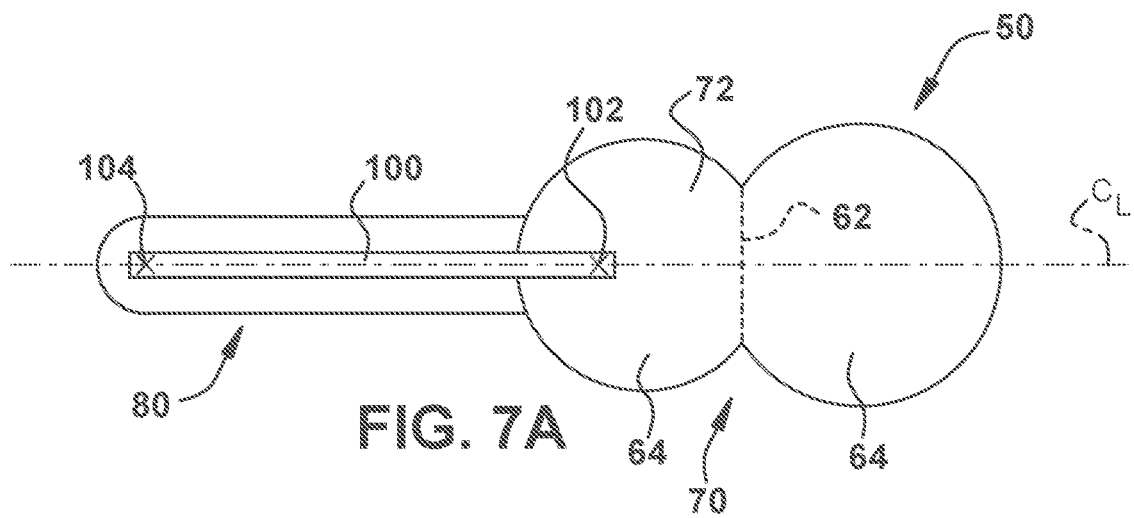
FIGS. 7A-7C are side views showing different example curve configurations that can be implemented in the knee airbag.
Figure 7B:
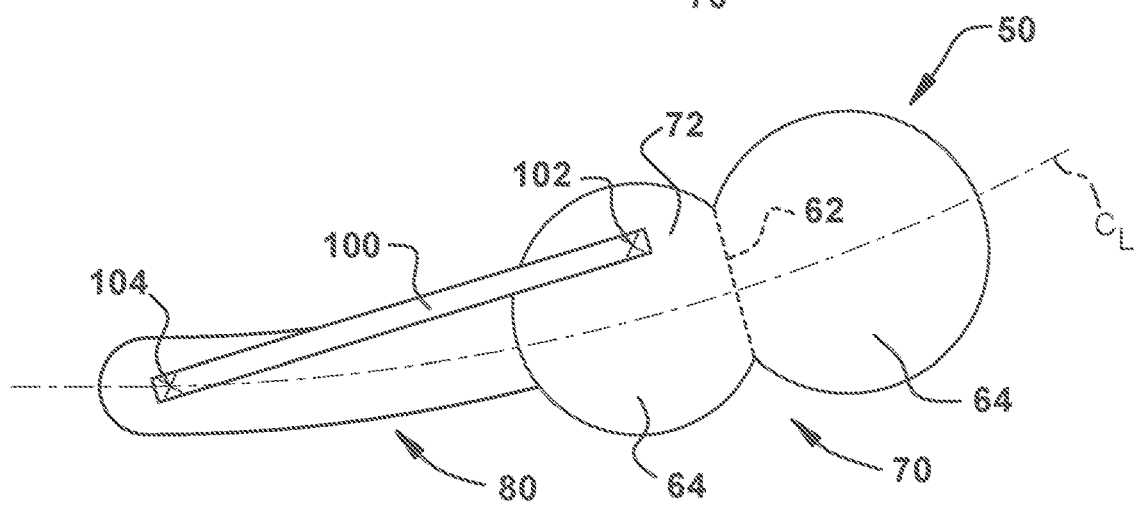
Figure 7C:
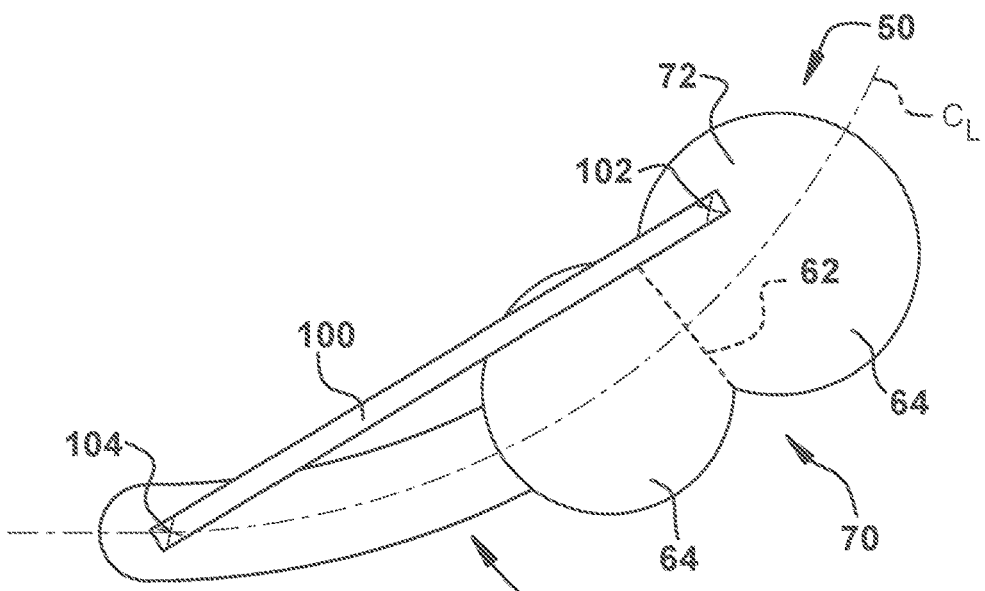

In addition to the functions described above, the tethers 100 can also help to enforce a curved configuration of the knee airbag 50, which helps ensure that the airbag deploys to a proper position against the instrument panel 20 and/or following the contour of the instrument panel. This is shown in FIGS. 7A-7C. As shown in FIG. 7A, the first and second ends 102, 104 of the tether 100 are connected to the knee airbag 50 along the centerline $C_L$. The first end 102 is connected to a first chamber 64, i.e., the chamber of the cushion portion 70 that intersects the filling portion 80. Because both ends of the tether are connected along the centerline $C_L$, the restraining force exerted on the cushion portion 70 by the tether 100 is parallel to the centerline $C_L$. As a result, the knee airbag 50 of FIG. 7A, when inflated, has a generally flat configuration, i.e., the centerline $C_L$ is linear.

As shown in FIG. 7B, the second end 104 of the tether 100 is connected to the knee airbag 50 along the centerline $C_L$. The first end 102 of the tether 100, however, is connected to the knee airbag 50, specifically the first chamber 64, above the centerline $C_L$. As a result, tension on the tether 100 when the knee airbag 50 inflates and deploys restricts movement of the first chamber 64, which causes the knee airbag to adopt an upwardly curved configuration (i.e., curved along the centerline $C_L$), as shown in FIG. 7B. The degree of curvature imposed on the knee airbag 50 by the tether 100 can be configured through position of the tether connection to the chamber 64 relative to the centerline $C_L$, and through the length of the tether. According to this configuration, the further the connection of end 102 from the centerline $C_L$ and/or the shorter the tether 100, the higher the degree of bag curvature.

As shown in FIG. 7C, the second end 104 of the tether 100 is connected to the knee airbag 50 along the centerline $C_L$. The first end 102 of the tether 100, however, is connected to the knee airbag 50, specifically the second or end chamber 64, above the centerline $C_L$. As a result, tension on the tether 100 when the knee airbag 50 inflates and deploys restricts movement of the end chamber 64, which causes the knee airbag to adopt an upwardly curved configuration (i.e., curved along the centerline $C_L$), as shown in FIG. 7C. Again, the degree of curvature imposed on the knee airbag 50 by the tether 100 can be configured through position of the tether connection to the chamber 64 relative to the centerline $C_L$, and through the length of the tether. In the configuration of FIG. 7C, it can be seen that the configuration of the length of the tether 100 and/or the location of the tether connection 102 produces a higher degree of curvature than the configuration of FIG. 7B.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A knee airbag comprising:
   overlying panels interconnected along a perimeter connection to define an inflatable volume of the knee airbag;
   wherein the knee airbag comprises a filling portion and a cushion portion, the filling portion being configured to receive inflation fluid from an inflator and to direct the inflation fluid from the inflator to the cushion portion, the cushion portion having a width that is greater than a width of the filling portion and extending laterally beyond the width of the filling portion on opposite sides of the filling portion; and
   at least one tether having a first end connected to the cushion portion vertically above a centerline of the knee airbag and an opposite second end connected to the cushion portion along the centerline of the knee airbag to anchor the at least one tether so that the at least one tether is configured to limit movement of the cushion portion and to help position the cushion portion relative to a vehicle surface for which the knee airbag is configured to help prevent impacts from a vehicle occupant.

2. The knee airbag recited in claim 1, wherein the overlying panels are interconnected within the perimeter connection along one or more interior connections that define inflatable chambers within the inflatable volume.

3. The knee airbag recited in claim 1, wherein the at least one tether is located outside the inflatable volume of the knee airbag.

4. The knee airbag recited in claim 3, wherein the first end of the at least one tether is connected to an exterior surface of the cushion portion and the second end of the at least one tether is connected to an exterior surface of the filling portion.

5. The knee airbag recited in claim 1, wherein the at least one tether is configured to become tensioned in response to the knee airbag being inflated, and wherein the at least one tether is configured to enforce a curved configuration of the knee airbag in response to being tensioned in response to the knee airbag being inflated.

6. The knee airbag recited in claim 1, wherein the filling portion has a first end configured to receive inflation fluid from the inflator, and the cushion portion is fluidly connected to the filling portion at a second end of the filling portion, opposite the first end of the filling portion.

7. The knee airbag recited in claim 6, wherein the knee airbag is configured to have a generally T-shape, wherein the filling portion has a length that extends along the centerline of the knee airbag and the width of the filling portion extends transverse to the length, and the width of the cushion portion extends transverse to the centerline and laterally beyond opposite lateral sides of the filling portion.

8. The knee airbag recited in claim 7, wherein the at least one tether extends diagonally from the first end of the filling portion to a lateral end of the cushion portion.

9. The knee airbag recited in claim 7, wherein the at least one tether comprises a first tether that extends diagonally from the first end of the filling portion to a first lateral end of the cushion portion, and a second tether that extends diagonally from the first end of the filling portion to a second lateral end of the cushion portion, opposite the first lateral end of the cushion portion.

10. The knee airbag recited in claim 1, wherein the overlying panels comprise flat fabric panels that are similarly or identically patterned, wherein the panels are configured to lie flat in the overlying manner while the perimeter connection and any interior connections within the perimeter connection are formed.

11. The knee airbag recited in claim 1, wherein the perimeter connection and any interior connections within the perimeter connection are formed by stitching or ultrasonic welding.

12. A knee airbag module comprising:
    the knee airbag recited in claim 1;
    an inflator for inflating the knee airbag; and
    a housing for supporting the knee airbag and inflator, the housing comprising an opening through which the knee airbag deploys;
    wherein the housing is configured to be mounted in an instrument panel of a vehicle in the area of a footwall of the vehicle.

13. A vehicle safety system comprising the knee airbag module recited in claim 12, a sensor configured to sense the occurrence of an event for which deployment of the knee airbag is desired, and a controller configured to actuate the inflator to deploy the knee airbag in response to the sensor.

14. A vehicle safety system comprising the knee airbag module recited in claim 12, wherein the second end of the at least one tether is connected to the housing.

* * * * *